United States Patent
Daigle

(10) Patent No.: US 8,144,544 B2
(45) Date of Patent: Mar. 27, 2012

(54) METHOD OF PROCESSING ECHO PROFILE, AND PULSE-ECHO SYSTEM FOR USE WITH THE METHOD

(75) Inventor: Frank Daigle, Stouffville (CA)

(73) Assignee: Siemens Aktiengesellschaft, Munich (DE)

( * ) Notice: Subject to any disclaimer, the term of this patent is extended or adjusted under 35 U.S.C. 154(b) by 306 days.

(21) Appl. No.: 12/384,870

(22) Filed: Apr. 9, 2009

(65) Prior Publication Data

US 2009/0257310 A1   Oct. 15, 2009

(30) Foreign Application Priority Data

Apr. 10, 2008 (EP) .................................... 08007141

(51) Int. Cl.
*G01S 15/00* (2006.01)
(52) U.S. Cl. ............................................ 367/98; 367/99
(58) Field of Classification Search .................... 367/99, 367/98
See application file for complete search history.

(56) References Cited

U.S. PATENT DOCUMENTS

| | | | | |
|---|---|---|---|---|
| 4,596,144 A * | 6/1986 | Panton et al. ................ 73/290 V |
| 4,831,565 A * | 5/1989 | Woodward ...................... 367/99 |
| 4,890,266 A * | 12/1989 | Woodward ...................... 367/99 |
| 4,992,998 A * | 2/1991 | Woodward ...................... 367/99 |
| 5,079,751 A * | 1/1992 | Woodward ...................... 367/96 |
| 5,511,041 A * | 4/1996 | Michalski ...................... 367/99 |
| 5,983,730 A | 11/1999 | Freund et al. |
| 6,046,960 A | 4/2000 | Kumar |
| 6,169,706 B1 * | 1/2001 | Woodward et al. ............. 367/99 |
| 6,298,008 B1 * | 10/2001 | Lyon et al. ..................... 367/99 |
| 6,445,192 B1 | 9/2002 | Lovegren et al. |
| 6,935,177 B2 * | 8/2005 | Wall ............................... 73/597 |
| 6,961,665 B2 * | 11/2005 | Slezak ............................ 702/61 |
| 7,054,227 B2 * | 5/2006 | Daigle ............................ 367/99 |
| 7,420,877 B2 * | 9/2008 | Hosseini et al. ................ 367/99 |
| 2005/0066732 A1 * | 3/2005 | Daigle ............................ 73/615 |
| 2009/0257310 A1 * | 10/2009 | Daigle ............................ 367/99 |
| 2009/0257311 A1 * | 10/2009 | Daigle ............................ 367/99 |

FOREIGN PATENT DOCUMENTS

EP    2108976 A1 * 10/2009

* cited by examiner

*Primary Examiner* — Daniel Pihulic

(57) ABSTRACT

An echo profile in a pulse-echo ranging system is processed by determining the relative slope at points on the profile, determining the relative area of each region of positive slope on the profile, identifying within the region having the largest relative area a point of greatest relative slope as a leading edge reference point, and using either said leading edge reference point or a peak within the echo profile as an echo timing measurement point.

10 Claims, 9 Drawing Sheets

METHOD OF PROCESSING ECHO PROFILE, AND PULSE-ECHO SYSTEM FOR USE WITH THE METHOD

CROSS REFERENCE TO RELATED APPLICATIONS

This application claims priority of European Patent Application No. 08007141.8 EP filed Apr. 10, 2008, which is incorporated by reference herein in its entirety.

FIELD OF INVENTION

This invention relates to a method for processing an echo profile, and to a pulse-echo ranging system using such a method.

BACKGROUND OF INVENTION

The use of pulse-echo ranging systems for measuring, for example, the depth of a liquid in a tank is well known. In principle, the time elapsed between transmission of a pulse and receipt of an echo can be used to measure the depth of the liquid. In practice, however, a number of problems arise.

One is how to determine the "best" point in the echo profile to be used for timing. Typically either the echo peak or the leading edge is used, and various methods are known. These generally assume a well shaped echo, and select either the peak of the echo or a point on the leading edge. However, not all echoes returned are clean, well-shaped echoes, with the result that the represented distance can change from echo to echo, even when the actual distance is not changing.

SUMMARY OF INVENTION

Often the echo is a combination of multiple echoes caused by the signal taking multiple paths. For example, a second path may be reflected off the container wall and be slightly longer than the shortest path. This can result in two echoes very close to each other, or a single echo that is a combination of the two paths. These echoes may have more than one peak.

Another issue is where the echo shape is not clearly defined. The leading edge may have plateaus. If the point picked is close to a plateau, the measured distance may vary significantly.

An object of the invention is to overcome or mitigate these problems.

The present invention provides a method of processing an echo profile in a pulse-echo ranging system, the method comprising:
  forming the echo profile into a succession of digital values at spaced points in time;
  determining the relative slope at each of said points;
  identifying regions of positive slope within the echo profile;
  determining the relative area of the region or each region of positive slope;
  identifying within the region having the largest relative area a point of greatest relative slope as a leading edge reference point;
  identifying one or more peaks within the echo profile by detecting points where the relative slope transitions from positive to negative; and
  using either said leading edge reference point or said peak(s) as an echo timing measurement point.

The method of the invention provides more reliable and uniform reference points in the echo profile.

Where the echo contains multiple peaks, one of the peaks may be selected in the following manner:
  (a) the first peak is selected if it is of greater amplitude than the subsequent peaks; and
  (b) otherwise, the peak which follows said leading edge reference point is selected.

This allows reliable discrimination between multiple peaks produced by multiple paths.

A peak may be further detected by expanding back and forward from the detected slope transition to a predefined amplitude level, and selecting the mid-point of the expanded area. This is useful where the echo is of a flat-topped shape with no distinct peak.

Preferably the peak is expended to points where the echo amplitude is 20% of the maximum peak amplitude.

Typically the pulse-echo system is ultrasonic. Alternatively, the pulse-echo system may be a radar system.

From another aspect, the invention provides a pulse echo ranging system comprising transducer means, a transmitter for supplying energy pulses to the transducer means, a receiver for receiving energy pulses from the transducer means, and processing means; the processing means being configured to
  select echoes from the received signal,
  perform analog-to-digital conversion to produce an echo profile in the form a succession of digital values at spaced points in time, and
  process the echo profile by the method defined above.

BRIEF DESCRIPTION OF THE DRAWINGS

An embodiment of the present invention will now be described, by way of example only, with reference to the drawings, in which.

DETAILED DESCRIPTION OF INVENTION

Figure 1:
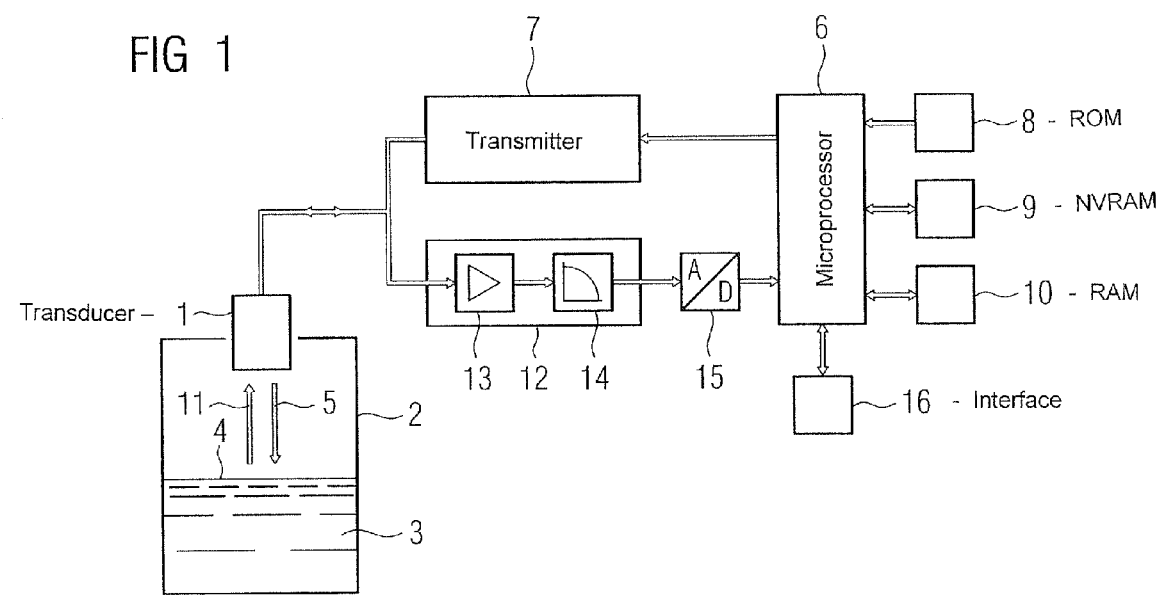
FIG. 1 is a schematic of a pulse-echo measurement system forming one embodiment of the present invention.

Referring to FIG. 1, which is a simplified schematic diagram, a pulse-echo ranging system comprises an ultrasonic transducer 1 which is installed in a tank 2 containing a liquid 3, or other type of material, with a level determined by the top surface 4 of the liquid 3. The top surface 4 of the liquid 3 provides a reflective surface which reflects ultrasonic pulses 5 generated from the transducer 1. The transducer 1 is coupled to a microprocessor 6 through a transmitter 7. The microprocessor 6 operates under a control program stored in read-only memory (ROM) 8, utilizing parameters stored in non-volatile random access memory (NVRAM) 9, and provided with a working memory in the form of random access memory (RAM) 10.

The microprocessor 6 controls the transmitter 7 to excite the transducer 1 to emit the ultrasonic pulses 5 at predetermined points in time and with predetermined frequency and amplitude. The reflected or echo pulse 11 is received by the transducer 1 and converted to an electric signal which is then fed to a receiver 12. The receiver 12 comprises an amplifier 13 and an envelope detector 14. The output from the envelope detector 14 is then sampled and digitized by an analog-to-digital converter 15, from where the digital echo profile is stored in the RAM 10 for further processing by the microprocessor 6. The microprocessor 6 executes an algorithm, as will be described below, to identify the most relevant point on the echo profile from which to derive time-of-flight and thus distance information, and thereby the level of the liquid 3 in the tank 2. An interface 16, controlled by the microprocessor 6, provides for the export of depth-related data and the import of operating parameters. Data may be exported in the form of a display, telemetry (e.g. bus) signals, and/or alarm signals.

Figure 2:
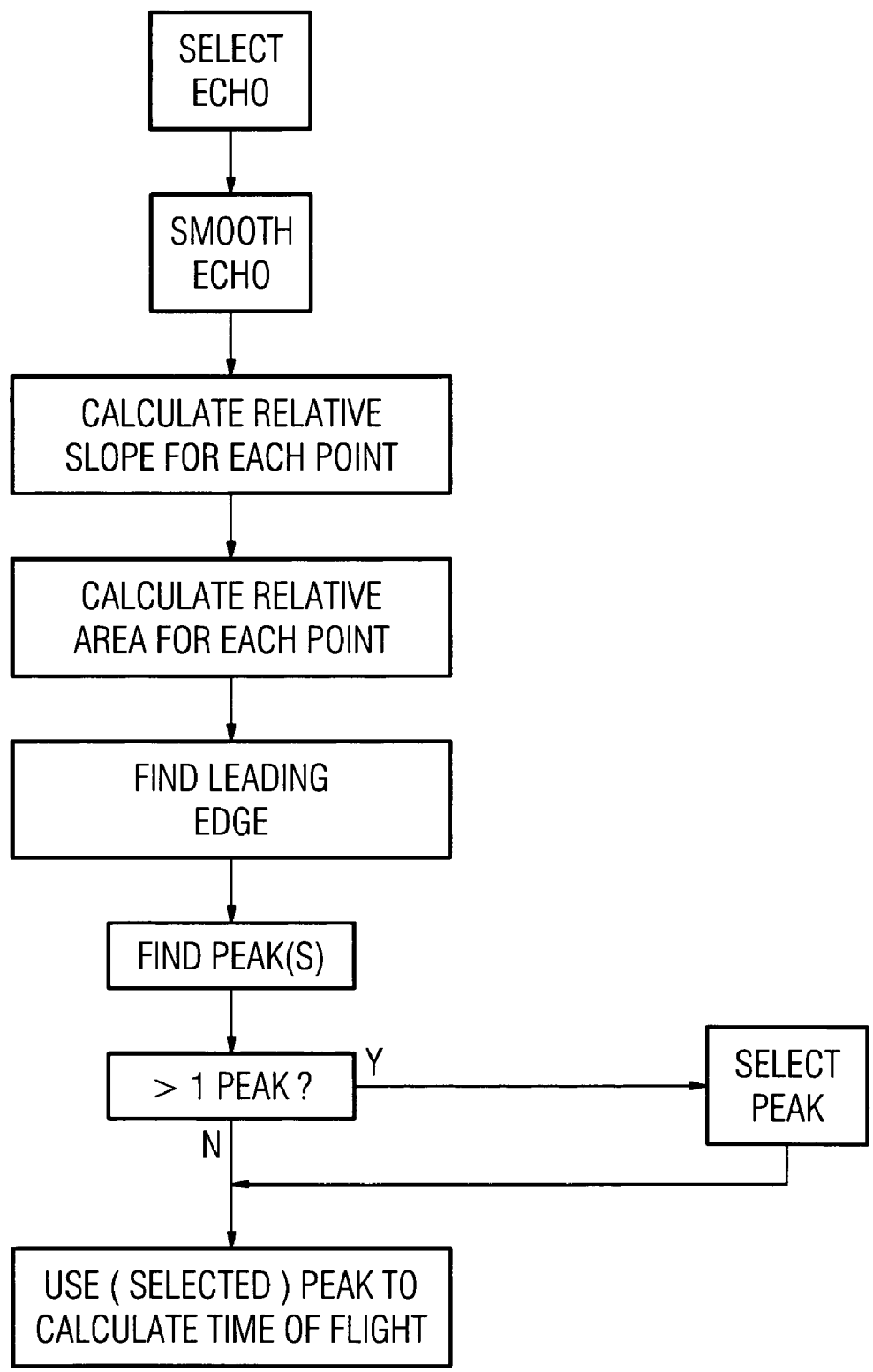
FIG. 2 is a flow chart representing an algorithm which may be used in the present invention.

Referring to FIG. 2, there will now be described one example of the algorithm executed by the microprocessor.

The first step is the selection of the desired echo, from a starting valley to an ending valley. This step is well known per se and does not require to be described in detail.

The next step is to provide some smoothing function on the echo to eliminate minor fluctuations. Any first order filter should be sufficient. It is assumed that the echo is provided as a set of discrete points of equal spacing.

The next step is to find the relative slope between each pair of points. The classical definition of slope between two points is rise/run or (y2−y1)/(x2−x1). Since we are assuming that the x coordinates are all equally spaced, the denominator will always be the same and we can simplify by using a value of 1 for the denominator. This leaves (y2−y1) for the rise between each pair of points.

Therefore we define the relative slope for each point n as $$rs = y(n) - y(n-1)$$

There are generally two areas of the echo which are used to mark the distance.

The first is the leading edge. The part of the leading edge which best represents the desired distance is the part that has the greatest slope. However, there may be multiple leading slopes. The part which is desired is the longest leading edge part of the echo. Leading edge slopes will have rs positive. The longest leading edge part of the echo will be the section that has the greatest area under the slope graph. To find this we can accumulate the area by adding the slope for each point that is positive. If the slope is zero or negative, we reset the area back to zero and look for the next positive slope. By doing this we arrive at an area for each leading edge part of the echo.

Thus, the next step of the algorithm can be expressed as:

If($rs > 0$), $ra(n) = ra(n-1) + rs$ else $ra(n) = 0$ where ra is relative area.

Next, to find the longest leading edge with the greatest slope, we search the set of points within the largest ra for the point with the largest slope value. This gives us the portion of the echo most likely to represent the correct distance.

To find the best peak, we use the same data. In this case we search for points on the slope graph where the slope rs goes from positive to negative, each of which represents a peak.

Some echo peaks may be relatively flat. To find the centre of the peak, a preferred method again uses the maximum slope value. Starting at the point on the slope graph where the slope crosses the x-axis (i.e. transitions from positive to negative slope), we expand the peak backwards and forwards until the slope is greater than some percentage, suitable a relatively small percentage, of the maximum slope. An example would be to look for 20% of the maximum slope value. This defines the whole peak, and we can then choose the mid-point between these two as the best peak value.

If multiple peaks are found in a single echo, the extra peaks are most likely to be caused by reflections and to be of lower amplitude. Thus, if the first peak has greater amplitude than the subsequent peak(s), the first peak is chosen. If there are one or more other peaks of greater amplitude than the first peak, then the peak that should be selected is the one that follows the largest leading edge as defined above.

The time of flight can then be measured based on the selected peak or, if desired, on the greatest slope portion of the longest leading edge.

Figure 3:
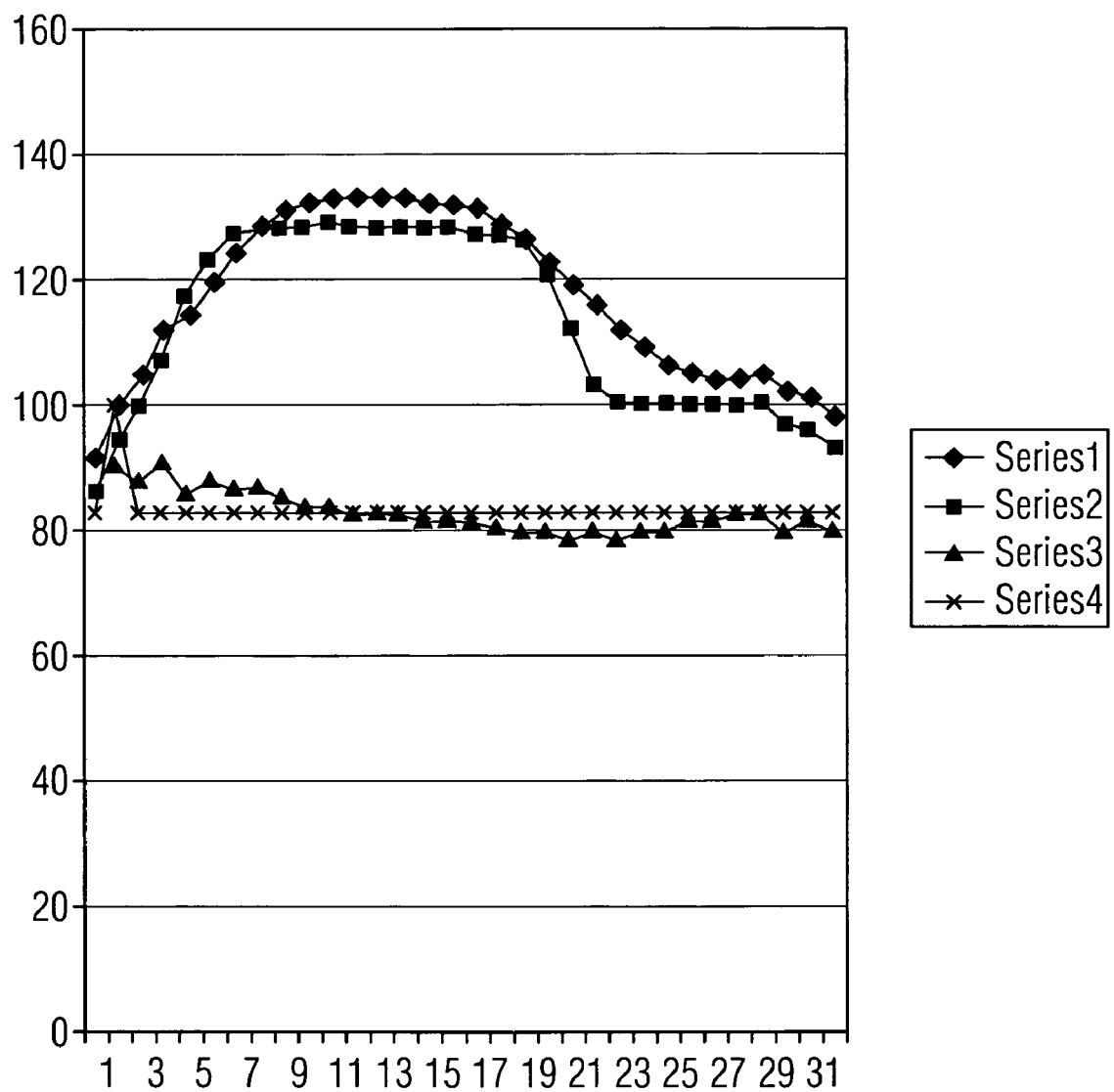
FIGS. 3 to 9 illustrate the operation of the algorithm of FIG. 2.
Figure 4:
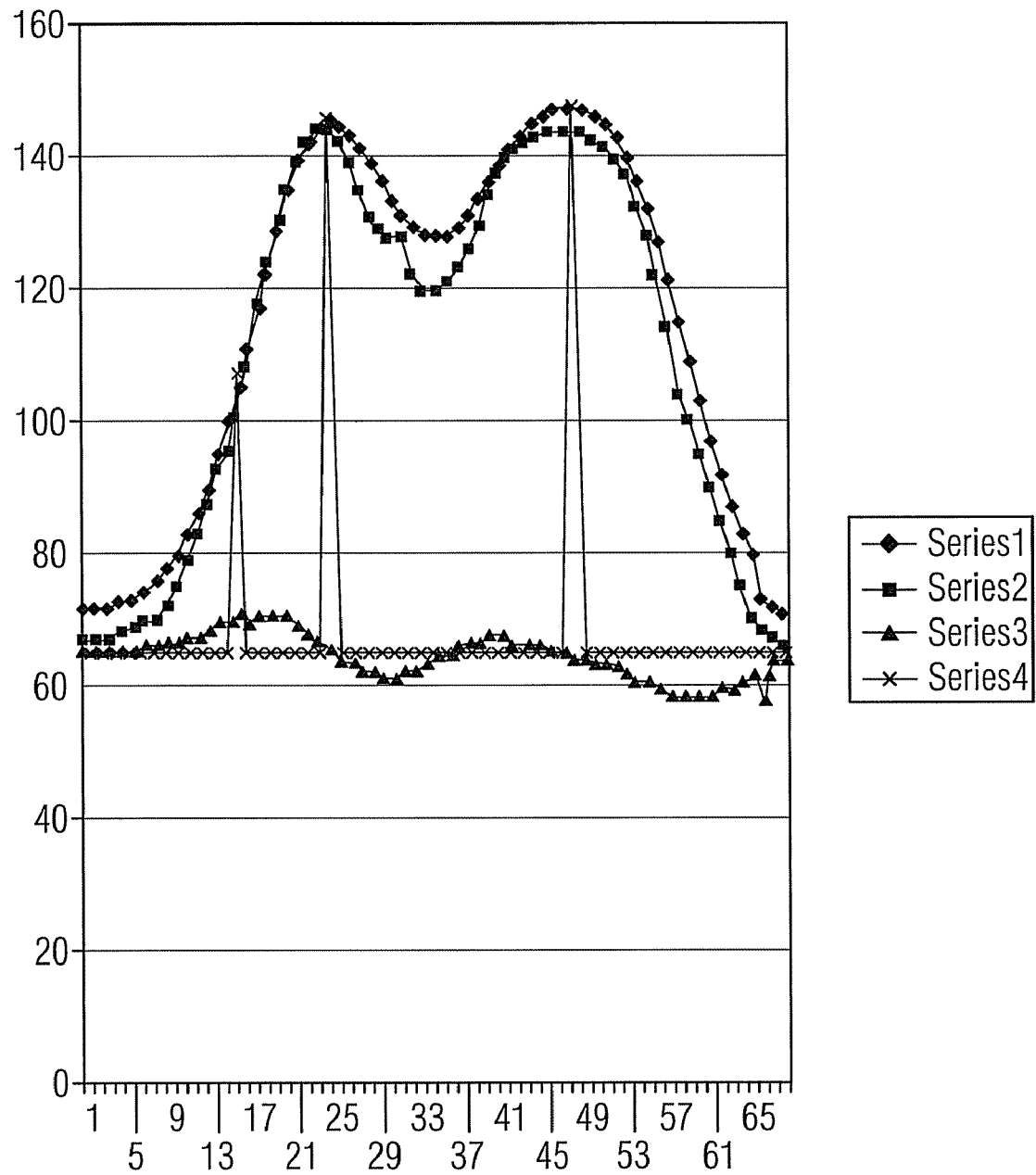
Figure 5:
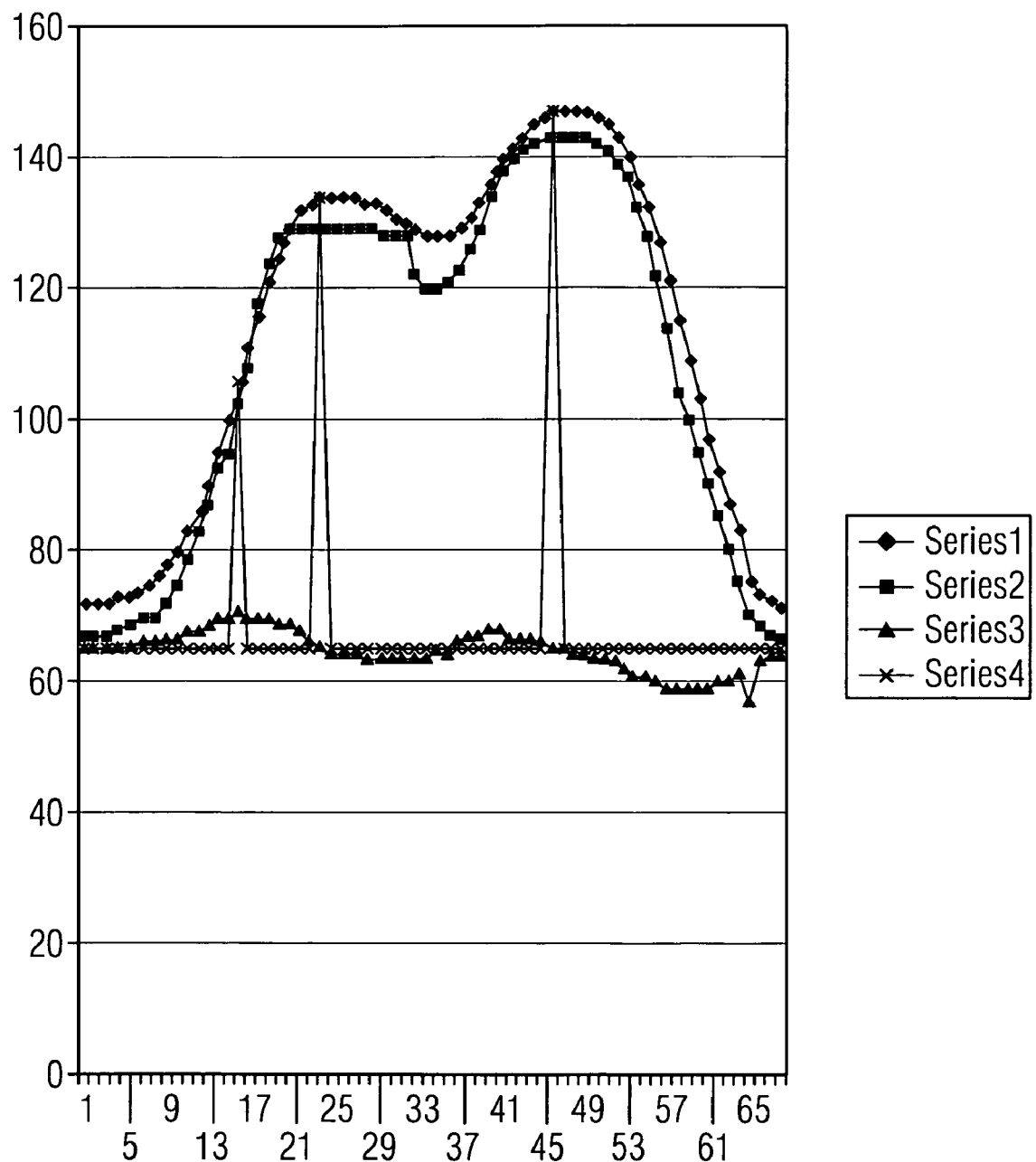
Figure 6:
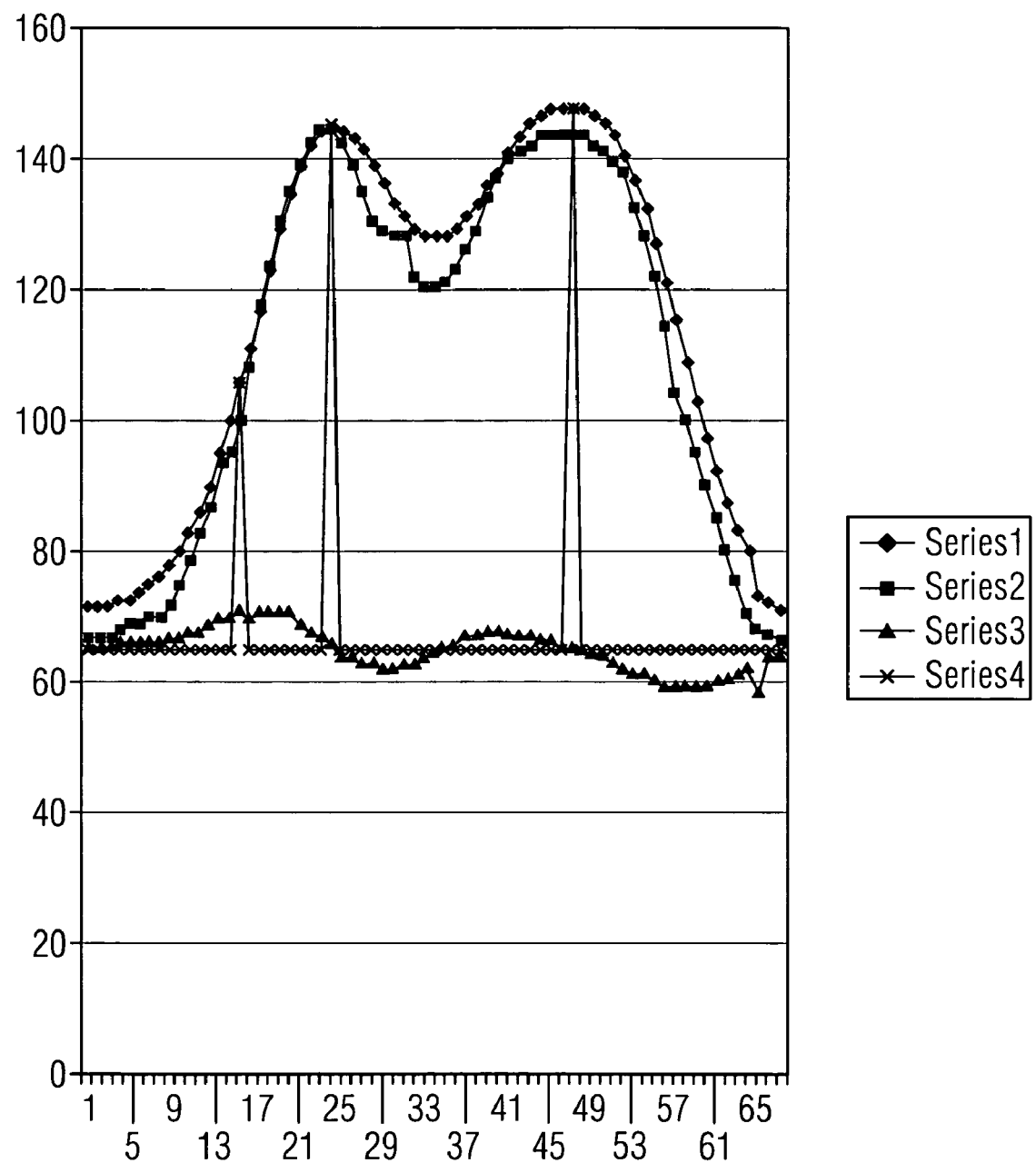
Figure 7:
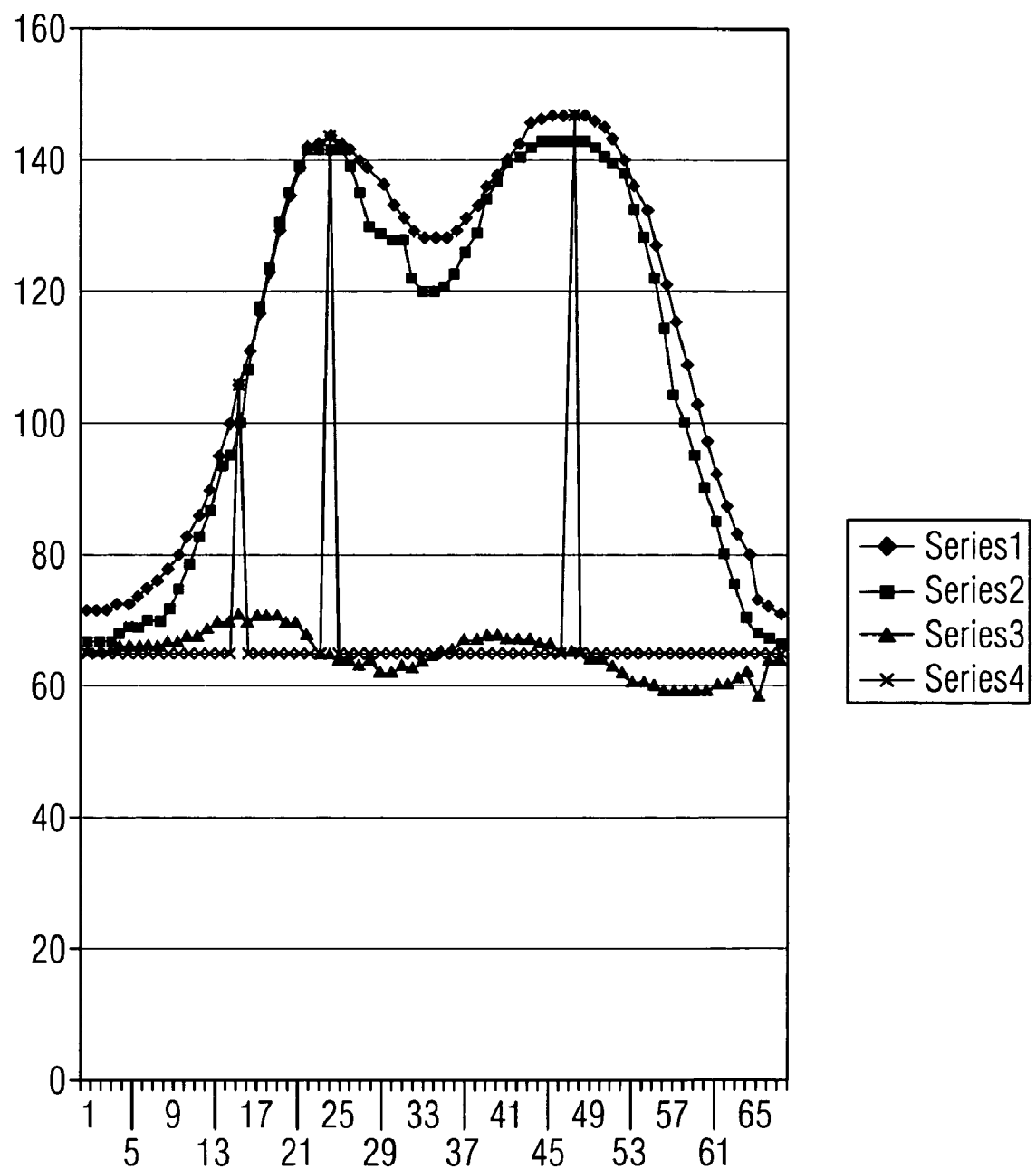
Figure 8:
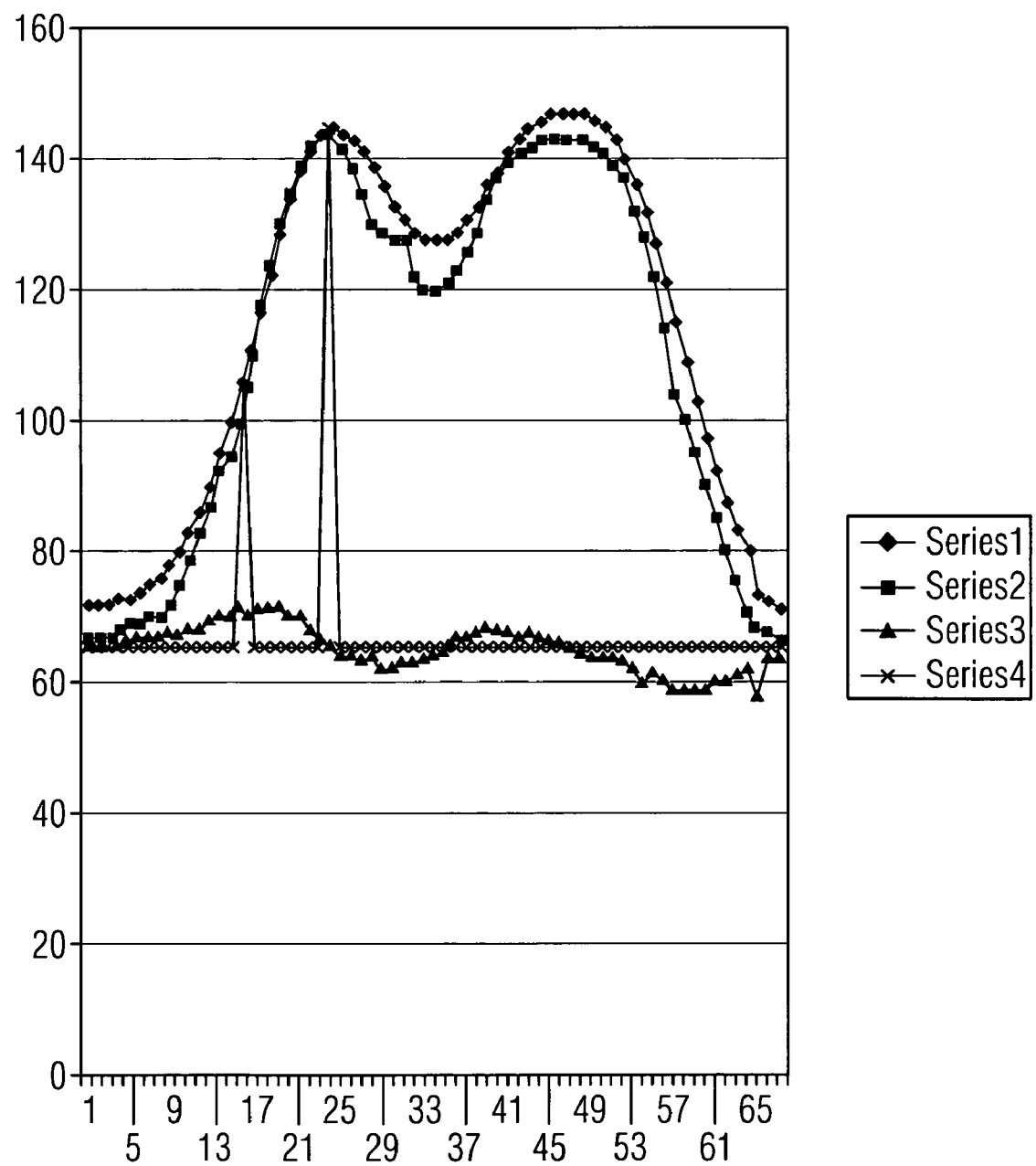
Figure 9:
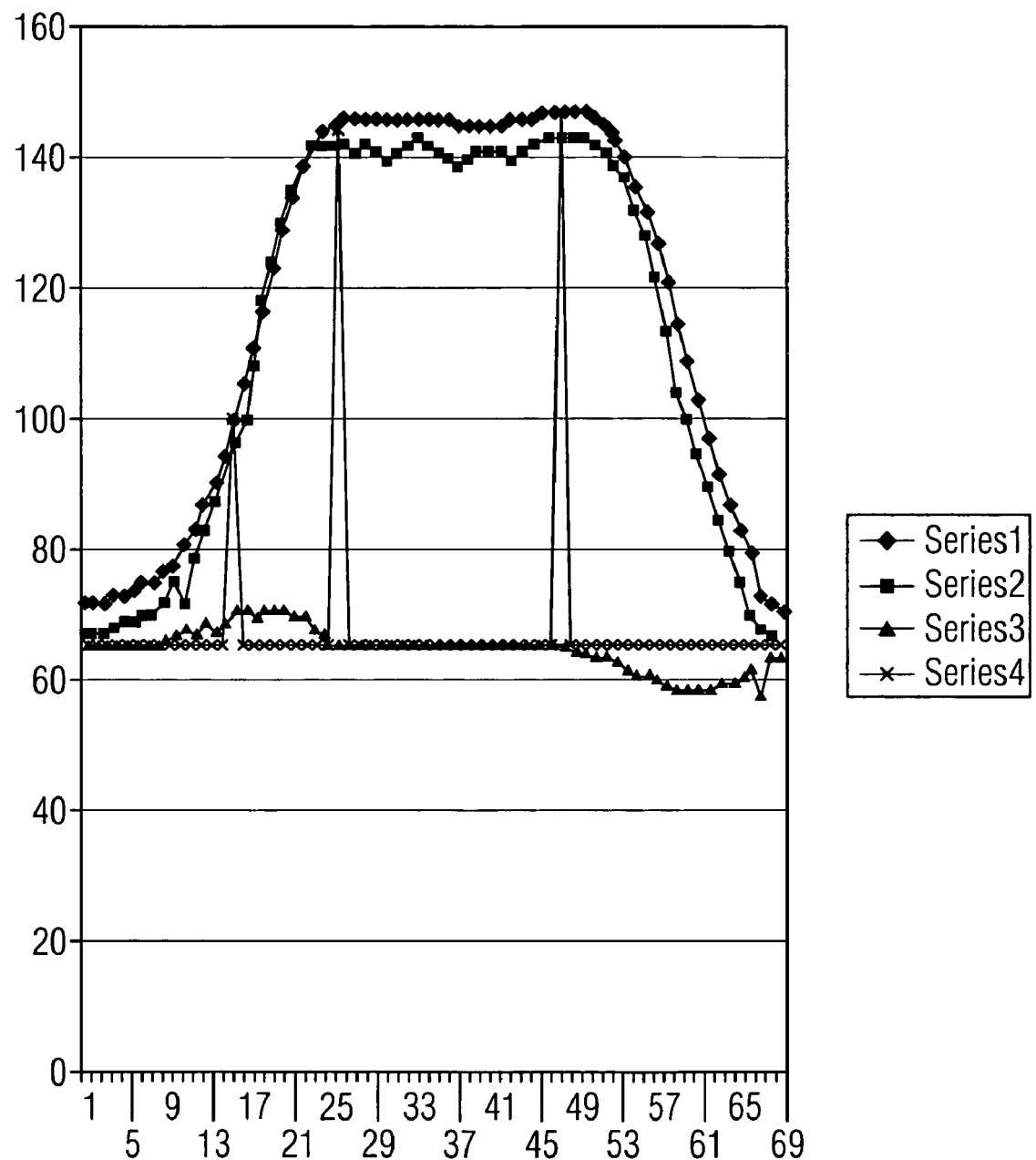

FIGS. 3-7 show examples of echo profiles, and illustrate the foregoing steps. In all of these figures, the points identified as Series 2 indicate the raw echo profile, Series 1 is the smoothed echo profile, Series 3 shows the slope data, and Series 4 marks the selected echo areas. FIG. 3 shows a simple echo profile. FIG. 4 shows a simple echo profile with noise. FIGS. 5, 6 and 7 show two peak echoes with the second peak larger. FIG. 8 shows a two peak echo with the first peak larger. FIG. 9 shows an echo with a noisy plateau which resolves to a two peak echo with the second peak larger.

The present invention thus provides a means of analyzing complex echo patterns in a relatively simple manner which can be efficiently implemented in microprocessors.

The invention claimed is:

1. A method of processing an echo profile in a pulse-echo ranging system, comprising:
   providing and using a tank containing a material, wherein the tank comprises an ultrasonic transducer;
   providing and using a microprocessor which is coupled to the ultrasonic transducer via a transmitter;
   generating ultrasonic pulses using the ultrasonic transducer, wherein the ultrasonic pulses are reflected by a top surface of the material in the tank;
   receiving reflected pulses by the transducer and converting the reflected pulses into electrical signals;
   generating a digital echo profile based on the electrical signals, wherein the digital echo profile is processed by the microprocessor, comprising:
      forming the digital echo profile into a succession of digital values at spaced points in time;
      determining a relative slope at each of the spaced points;
      identifying regions of positive slope within the echo profile;
      determining a relative area of the region or each region of positive slope;
      identifying, within the region having the largest relative area, a point of greatest relative slope as a leading edge reference point;
      identifying one or more peaks within the echo profile by detecting points where the relative slope transitions from positive to negative; and
      using either said leading edge reference point or said peak(s) as an echo timing measurement point.

2. The method according to claim 1, wherein the echo profile contains multiple peaks, and one of the peaks is selected in the following manner:
   the first peak is selected if it is of greater amplitude than the subsequent peaks; and
   otherwise, the peak which follows said leading edge reference point is selected.

3. The method according to claim 1, further comprising:
   detecting a peak by expanding back and forward from the detected slope transition to a predefined amplitude level; and
   selecting the mid-point of the expanded area.

4. The method according to claim 2, further comprising:
  detecting a peak by expanding back and forward from the detected slope transition to a predefined amplitude level; and
  selecting the mid-point of the expanded area.

5. The method according to claim 3, wherein the peak is expended to points where the echo amplitude is 20% of the maximum peak amplitude.

6. The method according to claim 4, wherein the peak is expended to points where the echo amplitude is 20% of the maximum peak amplitude.

7. A pulse echo ranging system, comprising:
  an ultrasonic transducer;
  a transmitter for supplying energy pulses to the transducer;
  a receiver for receiving energy pulses from the transducer, wherein the receiver comprises an amplifier and an envelope detector; and
  a processing unit, wherein the processing unit is configured to
    select echoes from a received signal,
    perform an analog-to-digital conversion to produce an echo profile in form of a succession of digital values at spaced points in time, and
    process the echo profile,
  wherein processing the echo profile comprises:
    forming the echo profile into a succession of digital values at spaced points in time;
    determining a relative slope at each of the spaced points;
    identifying regions of positive slope within the echo profile;
    determining a relative area of the region or each region of positive slope;
    identifying within the region having the largest relative area a point of greatest relative slope as a leading edge reference point;
    identifying one or more peaks within the echo profile by detecting points where the relative slope transitions from positive to negative; and
    using either said leading edge reference point or said peak(s) as an echo timing measurement point.

8. The system according to claim 7, wherein the echo profile contains multiple peaks, and one of the peaks is selected in the following manner:
  the first peak is selected if it is of greater amplitude than the subsequent peaks; and
  otherwise, the peak which follows said leading edge reference point is selected.

9. The system according to claim 7, the processing further comprising:
  detecting a peak by expanding back and forward from the detected slope transition to a predefined amplitude level; and
  selecting the mid-point of the expanded area.

10. The system according to claim 9, wherein the peak is expended to points where the echo amplitude is 20% of the maximum peak amplitude.

\* \* \* \* \*